United States Patent [19]

Guess

[11] Patent Number: 4,743,033

[45] Date of Patent: May 10, 1988

[54] DYNAMIC SEAL ASSEMBLY FOR PISTON AND CYLINDER OPERATING IN SUBTERRANEAN WELLS

[75] Inventor: Edward L. Guess, Tulsa, Okla.

[73] Assignee: Baker Oil Tools, Inc., Orange, Calif.

[21] Appl. No.: 809,499

[22] Filed: Dec. 16, 1985

[51] Int. Cl.$^4$ .......................... F16J 9/00; F16J 15/16; F16J 15/46

[52] U.S. Cl. ........................ 277/27; 92/243; 92/246; 92/249; 92/253; 166/319; 277/30; 277/138; 277/188 A; 277/205; 277/212 C; 277/234; 277/235 R

[58] Field of Search ...................... 277/30, 236, 206 R, 277/205, 188 A, 234, 165, 235 R, 138, 212 C, 27; 166/84, 86, 121, 127, 191, 241, 202, 319, 321; 92/243, 246, 245, 244, 253, 249, 246; 175/325

[56] References Cited

U.S. PATENT DOCUMENTS

| | | | |
|---|---|---|---|
| 2,088,357 | 7/1937 | Waestefeldt | 92/246 X |
| 2,344,120 | 3/1944 | Baker | 166/202 X |
| 2,385,406 | 9/1945 | Dayton | 92/246 X |
| 2,405,152 | 8/1946 | Kilchenmann | 277/236 X |
| 2,672,199 | 3/1954 | McKenna | 166/121 X |
| 2,800,186 | 7/1957 | Tausch | 166/121 |
| 2,927,830 | 3/1960 | Workman | 277/205 X |
| 2,963,092 | 12/1960 | Anderson et al. | 166/121 |
| 2,992,052 | 7/1961 | DeJohn | 92/246 |
| 3,094,904 | 6/1963 | Healy | 92/243 X |
| 3,119,450 | 1/1964 | Evans | 166/121 X |
| 3,422,902 | 1/1969 | Bouchillon | 166/202 |
| 4,053,166 | 10/1977 | Domkowski | 277/205 X |
| 4,103,909 | 8/1978 | Hoffman et al. | 277/205 X |
| 4,329,916 | 5/1982 | Roeder | 166/191 X |
| 4,372,622 | 2/1983 | Cheek | 175/325 |
| 4,452,310 | 6/1984 | Pringle et al. | 166/319 |

FOREIGN PATENT DOCUMENTS 1019523 2/1966 United Kingdom ............... 277/205

Primary Examiner—Allan N. Shoap
Attorney, Agent, or Firm—Norvell & Associates

[57] ABSTRACT

A dynamic seal for effecting the sealing of a piston which is axially movable in a cylinder bore comprising a primary sealing element formed of a non-elastomeric sealing material having a hub portion secured to the piston element and an outwardly flaring skirt portion sealingly engagable with the cylinder bore. A secondary sealing element formed of a resilient metal has its central body portions secured to the piston element and defines a frustro-conical lip portion snugly engaging the exterior of the skirt portion of the primary seal element. Fluid pressure applied to the primary seal element causes it to expand the secondary seal element into a metal-to-metal sealing engagement with the bore of the cylinder.

2 Claims, 1 Drawing Sheet

DYNAMIC SEAL ASSEMBLY FOR PISTON AND CYLINDER OPERATING IN SUBTERRANEAN WELLS

BACKGROUND OF THE INVENTION

1. Field of the Invention

The invention relates to a dynamic seal assemblage for effecting the sealing of a piston which is axially movable in a cylinder bore under conditions of extremely high pressure and adverse environmental conditions.

2. Summary of the Prior Art

Hydraulic piston and cylinder assemblies find many applications in subterranean wells, particularly for the operation of safety valves. Such assemblies must operate under extreme conditions of pressure and exposure to a corrosive environment created by the well fluids and gases that are always present.

Many seals have been employed utilizing simple elastomeric elements such as O-rings and T-rings. But for a dynamic seal against high pressures on the order of 15,000 psi and higher, these elastomeric seals have not successfully prevented the passage of gases and other fluids around the seals, or failure of the seal due to extrusion of the elastomeric material. In an effort to solve the problem, it has been suggested that metal-to-metal seals be employed for this application. See, for example, U.S. Pat. No. 4,452,310. Metal-to-metal seals have not been satisfactory, because for them to be functional, the spacing between the seal element and the cylinder bore is required to be on the order of 0.0005-inch. This minimal degree of clearance is very difficult and expensive to obtain in the manufacture and assembly of the components. Finely honed surfaces are a necessity. Moreover, it has been observed that sand is generally the downfall of metal-to-metal seals, inasmuch as the cooperating metal surfaces forming the seal are both hard, and then when sand particles get wedged between such surfaces, scratching or galling of the surfaces is bound to occur, thus laying the pattern for future leakage and deterioration of the seal.

SUMMARY OF THE INVENTION

The invention provides a dynamic seal for a piston operating in a cylinder bore in a high pressure, corrosive environment, wherein a primary seal is provided by an annular non-metallic, non-elastomeric sealing element which has a central hub portion secured to the piston and a radially outwardly and axially extending skirt portion which effects a sealing engagement with the wall of the cylinder bore. A secondary seal formed of flexible metal is provided also having a central body portion that is secured to the piston, but having an outwardly and axially flaring, annular sealing lip which snugly surrounds the similarly shaped surface of the skirt of the primary seal. A cylindrical sealing surface is formed on the extremity of the metal sealing lip, but such sealing surface is machined to a dimension several ten thousandths less than that of the cylinder bore so that the problems of sticking and galling encountered when attempting to assemble a minimal clearance piston within the cylinder bore are avoided.

The primary seal is responsive to fluid pressure in one direction to expand the seal skirt outwardly and at the same time move the sealing surface on the lip of the metal sealing element radially into sealing engagement with the cylinder bore.

Thus, an effective unidirectional sealing element is provided. If a bi-directional seal is required, a second primary seal, identical to the first-mentioned primary seal but facing in the opposite direction, is mounted on the piston in axially spaced relationship to the first mentioned seal. The metallic sealing member is provided at its other end with a radially outwardly and axially extending sealing lip snugly surrounding the skirt portion of this second primary sealing element and is movable into sealing engagement with the cylinder bore by pressure applied to the second primary sealing element in a direction opposite to the pressure applied to the first mentioned primary sealing element.

Not only does the composite non-elastomeric and metallic sealing assemblage heretofore described effectively prevent the passage of fluids through the seals at extremely high pressures, but is has the further advantage that if sand is entrained in the fluid being sealed, the sand particles tend to embed themselves in the relatively soft, non-elastomeric element and do not enter into a wedging relationship between the metallic sealing surface and the cylinder bore. A composite seal embodying this invention is very easily assembled and the piston containing the seal assembly can be inserted into or moved from the cylinder bore repeatedly without encountering any risk of galling the finely honed cylinder bore surface.

Further objects and advantages of the invention will be readily apparent to those skilled in the art from the following detailed description, taken in conjunction with the annexed sheet of drawings, on which is shown a preferred embodiment of the invention.

DESCRIPTION OF THE PREFERRED EMBODIMENT

Figure 1:
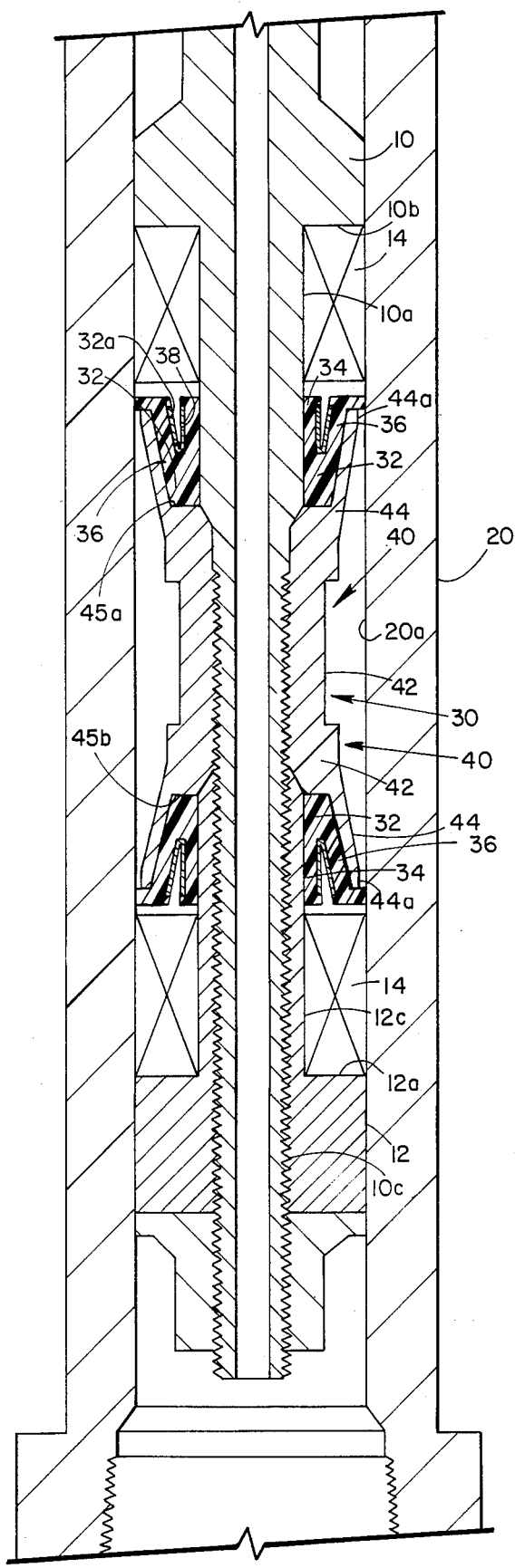
FIG. 1 is a sectional view of a piston and cylinder assembly incorporating a composite seal embodying this invention, with the composite seal in a non-sealing position.

Referring to the drawings, the piston 10 may be utilized to actuate a safety valve in a subterranean well by virtue of fluid pressures applied to such piston which is mounted in a precisely honed cylinder bore 20a of a cylinder 20. As will be recognized by those skilled in the art, the cylinder 20 is normally in a vertical position in a subterranean well. The piston 10 is provided with a reduced diameter end portion 10a defining a radial abutment shoulder 10b. The outer end of portion 10a is further reduced and is provided with external threads 10c. An abutment sleeve 12 is internally threaded onto the threads 10c and provides a radial abutment surface 12a in opposition to the radial abutment surface 10b formed on the piston element. A pair of conventional bearings 14, which can be of any well-known type and are therefore not illustrated in detail, are mounted immediately adjacent the abutment shoulders 10b and 12a.

Between the bearings 14, a composite seal 30 embodying this invention is mounted on the piston element. Seal 30 comprises two identical, though oppositely facing primary seal elements 32. Each seal element 32 has a central cylindrical hub portion 34 and a radially and axially extending frustoconical annular skirt portion 36 integrally formed with the hub portion 34 and defining an annular recess 32a. The hub portion 34 of the one seal is mounted in snug sealing engagement with the reduced diameter portion 10a of the mandrel 10, while the hub portion 34 of the other seal is mounted in snug sealing engagement with the cylidrical surface 12c which defines the shoulder 12a formed on the abutment sleeve 12. The outer periphery of the frustro-conical sealing portions 36 are provided with a cylindrical surface 36a which is sized to snugly and sealably engage the bore 20a of cylinder 20.

Both of primary seal elements 32 are formed of a tough non-metallic, non-elastomeric sealing material which will withstand the corrosive environment encountered in subterranean wells. A non-elastomeric material found to be particularly satisfactory for this application is polytetrafluoroethylene. Other materials are carbon graphite and materials sold under the trademarks Ryton and Graphoil. To facilitate the initial sealing action of the primary seal elements 32, a V-spring 38, or similar radial expanding element, is inserted in the recess 32a of each primary seal element 32. The only problem encountered with this type of non-elastomeric material is that it tends, under continuously applied high pressures, to extrude, and this tendency is completely eliminated by the second component of the composite seal which comprises a metallic sealing element 40.

Resilient metallic sealing element 40 has a tubular body portion 42 which is internally threaded to mount such element on the inner end of the mandrel threads 10c. Each end of the tubular body portion 42 is provided with an annular, frustroconical sealing lip 44 which extends in snug engagement around all of the periphery of the skirt portion 36 of the primary seal 32 except the actual sealing surfaces 36a. The outer extremity of each sealing lip 44 is machined to a cylindrical configuration indicated at 44a which has a reasonable clearance with the cylinder bore 20a (FIG. 1) so as to permit the ready insertion or removal of the piston assemblage in the cylinder without danger of scratching or galling the highly polished cylinder bore surface 20a. Secondary seal 40 additionally defines a pair of radial shoulders 45a and 45b which respectively abut the lower end face of the upper primary seal element 32 and the upper end face of the lower primary seal element 32.

Figure 2:
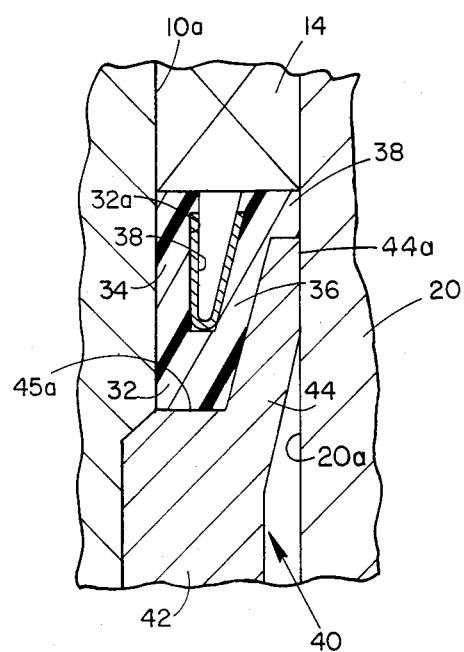
FIG. 2 is an enlarged scale, partial view of the composite seal in its sealing position.

The operation of the aforedescribed assemblage will be readily apparent to those skilled in the art. If a fluid pressure is applied to the cylinder bore 20a from the bottom, then the lowermost primary seal element 32 is expanded radially outwardly by such pressure and such expansion forces the sealing surfaces 44a of the frustroconical sealing lips 44 of the metallic seal 40 into metal-to-metal sealing engagement with the bore surface 20a of the cylinder (FIG. 2). If the fluid pressure is applied from the opposite direction, the upper primary seal 32 expands outwardly to produce a similar metal-to-metal sealing engagement between the cylindrical surface 44a at the top of the secondary seal member 40 with the cylinder bore 20a.

Regardless of which direction fluid pressure is applied, the aforedescribed structure provides an essentially zero clearance, metal-to-metal seal between the cylindrical sealing surface 44a and the cylinder bore 20c. Thus, leakage of fluids through the seal is minimized and extrusion of the non-elastomeric primary sealing material is substantially prevented. At the same time, if grains of sand are entrained in the fluid, and attempt to enter the metal-to-metal interface, they are trapped by the softer, non-elastomeric material of the primary seals 32 and prevented from entering such interface. In fact, the axial movements of the piston 10 in the cylinder bore 20a actually produces a wiping action of the cylinder bore 20a by the sealing surfaces 36a of the primary seal elements 32.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A bi-directional dynamic seal for a piston element concentrically mounted in a vertical cylindrical bore of a well tool for axial movement relative thereto, comprising: a first primary seal having a hub portion concentrically and sealably mounted relative to the exterior of said piston element; said first primary seal having a frustroconically shaped, annular skirt portion extending radially and downwardly from said hub portion into sealing engagement with the wall of the well tool defining said cylindrical bore; a second primary seal having a hub portion concentrically and sealably mounted relative to the exterior of the piston element in upwardly sapaced relation to said first primary seal; said second primary seal element having a frustroconically shaped annular skirt portion extending radially and upwardly from the respective hub portion into sealing engagement with the wall of said cylindrical bore; both said first and second primary seal elements being formed from a non-metallic, non-elastomeric sealing material; a metallic secondary seal element comprising a tubular body securable to said piston element intermediate said hub portions of said first and second primary seal elements, the axial end portions of said tubular body respectively defining frustro-conical, annular flexible lip portions respectively snugly surrounding said skirt portions of said first and second primary seals; each said lip portion having an external cylindrical surface of slightly smaller diameter than said cylindrical bore, whereby the application of a fluid pressure in either direction to said piston element causes one of said primary seals to expand and resiliently expand the adjacent secondary seal to force the external cylindrical surface of the adjacent lip portion into sealing engagement with said cylindrical bore.

2. The apparatus of claim 1 wherein said first and second primary seals are fabricated from polytetrafluorethylene.

* * * * *